United States Patent
Chambliss et al.

(12) 
(10) Patent No.: US 12,365,749 B2
(45) Date of Patent: Jul. 22, 2025

(54) RECYCLABLE HEAVY-GAUGE FILMS AND METHODS OF MAKING SAME

(71) Applicant: Colormasters, LLC, Albertville, AL (US)

(72) Inventors: Robert E. Chambliss, Trussville, AL (US); James Harvey, Guntersville, AL (US)

(73) Assignee: Colormasters, LLC, Albertville, AL (US)

( * ) Notice: Subject to any disclaimer, the term of this patent is extended or adjusted under 35 U.S.C. 154(b) by 193 days.

(21) Appl. No.: 18/070,922

(22) Filed: Nov. 29, 2022

(65) Prior Publication Data

US 2023/0174691 A1 Jun. 8, 2023

Related U.S. Application Data

(60) Provisional application No. 63/286,154, filed on Dec. 6, 2021, provisional application No. 63/328,840, filed on Apr. 8, 2022.

(51) Int. Cl.
| | |
|---|---|
| *C08F 110/02* | (2006.01) |
| *B29C 48/00* | (2019.01) |
| *B29C 48/08* | (2019.01) |
| *B29C 48/21* | (2019.01) |
| *B32B 27/08* | (2006.01) |
| *B32B 27/32* | (2006.01) |
| *B29K 23/00* | (2006.01) |
| *B29K 105/00* | (2006.01) |

(52) U.S. Cl.
CPC ........ *C08F 110/02* (2013.01); *B29C 48/0018* (2019.02); *B29C 48/08* (2019.02); *B29C 48/21* (2019.02); *B32B 27/08* (2013.01); *B32B 27/32* (2013.01); *B29K 2023/0616* (2013.01); *B29K 2023/0625* (2013.01); *B29K 2023/065* (2013.01); *B29K 2105/0094* (2013.01); *B29K 2995/0063* (2013.01); *B32B 2250/05* (2013.01); *B32B 2250/24* (2013.01); *B32B 2250/40* (2013.01); *B32B 2270/00* (2013.01); *B32B 2307/30* (2013.01); *B32B 2307/536* (2013.01); *B32B 2307/732* (2013.01); *B32B 2519/00* (2013.01)

(58) Field of Classification Search
CPC ... C08F 110/02; B29C 48/0018; B29C 48/08; B29C 48/21; B29C 48/885; B29C 48/10; B29C 48/91; B29K 2023/0616; B29K 2023/0625; B29K 2105/0094; B29K 2995/0063; B29K 2223/0616; B32B 2250/05; B32B 2250/24; B32B 2250/40; B32B 2270/00; B32B 2307/30; B32B 2307/536; B32B 2307/732; B32B 2519/00; B32B 2307/31; B32B 2307/41; B32B 2307/546; B32B 2307/7376; B32C 48/08
USPC ...................................... 264/210.1
See application file for complete search history.

(56) References Cited

U.S. PATENT DOCUMENTS

| | | | |
|---|---|---|---|
| 2012/0038089 A1* | 2/2012 | Orlych ................ | B29C 44/24 264/510 |
| 2012/0160728 A1* | 6/2012 | Brebion .............. | B29C 48/3363 156/229 |
| 2015/0104628 A1* | 4/2015 | O'Donnell .............. | B32B 27/32 428/216 |

* cited by examiner

*Primary Examiner* — Hannah J Pak
(74) *Attorney, Agent, or Firm* — Bradley Arant Boult Cummings LLP; Ryan J. Letson; Jessica L. Zurlo

(57) ABSTRACT

Methods of making recyclable heavy-gauge films are provided. The methods of the present disclosure involve bonding the inner layers of a coextruded blown film together such that the film is sufficiently thick enough for it to be oriented in the MDO section using the typical 5:1 orientation ratio and result in a film with twice the gauge typically made by the MDO process (while maintaining acceptable stiffness and dimensional rigidity). Recyclable heavy-gauge films formed by the methods are also provided.

9 Claims, 3 Drawing Sheets

RECYCLABLE HEAVY-GAUGE FILMS AND METHODS OF MAKING SAME

CROSS REFERENCE TO RELATED APPLICATIONS

This application claims priority to U.S. Provisional Patent Application No. 63/286,154, filed on Dec. 6, 2021, and U.S. Provisional Patent Application No. 63/328,840, filed on Apr. 8, 2022, which are fully incorporated herein by reference.

TECHNICAL FIELD

The present disclosure relates generally to recyclable thermoplastic films, and specifically to machine direction oriented (MDO) recyclable heavy-gauge films and methods for making the same.

BACKGROUND

Regulatory and public concerns regarding sustainability have driven the packaging industry to move to recyclable materials. This has caused the packaging industry to move away from the use of biaxially oriented polyester (BOPET) in many packaging applications, such as stand-up pouches and wet wipes pouches, due its non-recyclability into common consumer waste streams made up of polyethylene (PE). Indeed, soft pack disinfectant wet wipe pouches often are sold in soft pouches with an easy open peel and re-seal label. The label allows easy access to the wipes and allows for the wipes to be re-sealed for freshness. However, these wet wipe pouches are not recyclable because they typically use a combination of dissimilar polymers that are not miscible in the common consumer waste streams made up of PE.

There are challenges in finding a PE replacement for BOPET that has acceptable levels of stiffness, optical clarity, barrier properties, and heat resistance, especially for wet wipe pouches having the re-seal label. To work properly, the re-seal label must be very stiff, dimensionally rigid, and thick in gauge. Typically, the re-seal label needs to be twice as thick in gauge as the pouch body material itself. The current MDO process, however, inherently draws down the gauge by fivefold or more.

In typical MDO processes, each layer of film is extruded in a desired arrangement and air is blown into the extruded film to radially inflate the film into a bubble. When the bubble is collapsed onto itself, a pair of two separate 5 MIL multilayer films are generally formed. After the film is blown and cut, the two separate 5 MIL films proceed to a stretching section where the film goes through a series of rollers in order to mechanically stretch the film, which lowers its thickness. The current MDO process heats and orients the film until the gauge is reduced by approximately five times than in the extruded form. Indeed, the MDO process draws down the film from 5 MIL (which is the highest gauge thickness the machines can extrude) to 1 MIL, using a 5:1 orientation ratio, such that two separate 1 MIL sheets of film are ultimately formed. While this high level of orientation ratio provides the sheets of film with the proper level of stiffness and dimensional rigidity, the sheets formed by the MDO process lack the requisite thickness needed for heavy-gauge products, such as the re-seal labels on the wet wipe pouches.

Accordingly, there remains a need in the art for improved BOPET replacement films that are recyclable and can be used for packaging applications that require a heavy gauge film and improved techniques for producing the replacement films.

SUMMARY

The problems expounded above, as well as others, are addressed by the following inventions, although it is to be understood that not every embodiment of the inventions described herein will address each of the problems described above.

In some embodiments, a method of forming a multi-layer film is provided, the method including coextruding a film to form a bubble, wherein the bubble includes a first side and a second side, each of the first side and the second side including a plurality of co-extruded layers and having a first thickness, wherein each plurality of co-extruded layers includes an inner layer including a low melt point polymer having a melting point of about 100° C. or below; heating the low melt point polymer present in the inner layers to form a multi-layer film having a second thickness that is double the first thickness; and stretching the multi-layer film, wherein, after stretching, the multi-layer film has a third thickness that is at least about one-fifth of the second thickness. In further embodiments, the low melt point polymer is metallocene catalyzed, very-low-density polyethylene (m-VLDPE). In still further embodiments, each plurality of co-extruded layers includes a middle layer including a blend of a first thermoplastic polymer and a second thermoplastic polymer, each of the first thermoplastic polymer and the second thermoplastic polymer having a melt index of about 0.5 g/10 min. or less. In yet further embodiments, the low melt point polymer is present in the inner layers in an amount of about 70% to about 92% by weight.

In some embodiments, a method of forming a recyclable multi-layer film is provided, the recyclable multi-layer film including coextruding a film through a die to form a bubble, wherein the bubble includes a first side and a second side, each of the first and second sides including three co-extruded layers and having a first thickness, wherein the three co-extruded layers include an outer layer, a middle layer, and an inner layer, wherein the middle layer includes a blend of a first thermoplastic polymer and a second thermoplastic polymer, each of the first thermoplastic polymer and the second thermoplastic polymer having a melt index of about 0.5 g/10 min. or less, and the inner layer includes a low melt point polymer; drawing the bubble vertically upward and collapsing the bubble by passing the co-extruded film through two parallel rollers, wherein the parallel rollers are configured to heat the low melt point polymer present in the inner layers such that the inner layer on the first side and the inner layer on the second side are bonded together to form a recyclable, multi-layer film having a second thickness that is double the first thickness; and passing the recyclable multi-layer film through a series of in-line rollers configured to stretch the recyclable multi-layer film in at least one direction, wherein, after stretching, the recyclable multi-layer film has a third thickness that is at least about one-fifth of the second thickness.

In this embodiment, the low melt point polymer may have a melting point of about 100° C. or below. In other embodiments, the low melt point polymer may have a density of about 0.890 g/cm$^3$ to about 0.915 g/cm$^3$. In still other embodiments, the low melt point polymer may be metallocene catalyzed, very-low-density polyethylene (m-VLDPE). In some embodiments, the low melt point polymer is present in the inner layers in an amount of about 70% to about 92% by weight. In yet other embodiments, the first thermoplastic polymer is linear low-density polyethylene (LLDPE), super hexene linear low-density polyethylene (super hexene LLDPE), bimodal metallocene linear low-density polyethylene (mLLDPE), or a combination of the foregoing. In further embodiments, the second thermoplastic polymer is high-density polyethylene (HDPE), bimodal high-density polyethylene (bimodal HDPE), or a combination of the foregoing. The first thermoplastic polymer may have a melt index of about 0.5 g/10 min and the second thermoplastic polymer may have a melt index of about 0.45 g/10 min. In further embodiments, the first thickness is 5 MIL, the second thickness is 10 MIL, and the third thickness is 2 MIL.

In further embodiments, a recyclable multi-layer film formed by the method described above is provided. The recyclable multi-layer film may have a thickness of 2 MIL. In still other embodiments, a recyclable multi-layer film is provided, the recyclable multi-layer film including at least five layers having the following structure: A/B/C-C'/B'/A', wherein layers B and B' include a blend of a first thermoplastic polymer and a second thermoplastic polymer, each of the first thermoplastic polymer and the second thermoplastic polymer having a melt index of about 0.5 g/10 min. or less, and layers C and C' include a low melt point polymer having a melting point of about 105° C. to about 115° C., such as metallocene catalyzed, very-low-density polyethylene (m-VLDPE, and wherein the recyclable multi-layer film has a thickness of about 2 MIL. In further embodiments, layers A and A' may include high density polyethylene, polypropylene, a functionalized polyolefin, polyester, poly(ester-ether), polyamide, poly(ether-amide), polyether sulfone, or a combination of the foregoing. In still further embodiments, the first thermoplastic polymer may be super hexene LLDPE and the second thermoplastic polymer may be bimodal HDPE. The recyclable multi-layer films may have a Gurley stiffness (MD—machine direction) of about 120 to about 150 Gurley Units.

In still further embodiments, a packaging container including a peel label is provided, wherein the peel label is formed of any of the recyclable multi-layer films described above.

BRIEF DESCRIPTION OF THE DRAWINGS

Further features and advantages can be ascertained from the following detailed description that is provided in connection with the drawings described below.

DETAILED DESCRIPTION

Figure 1:
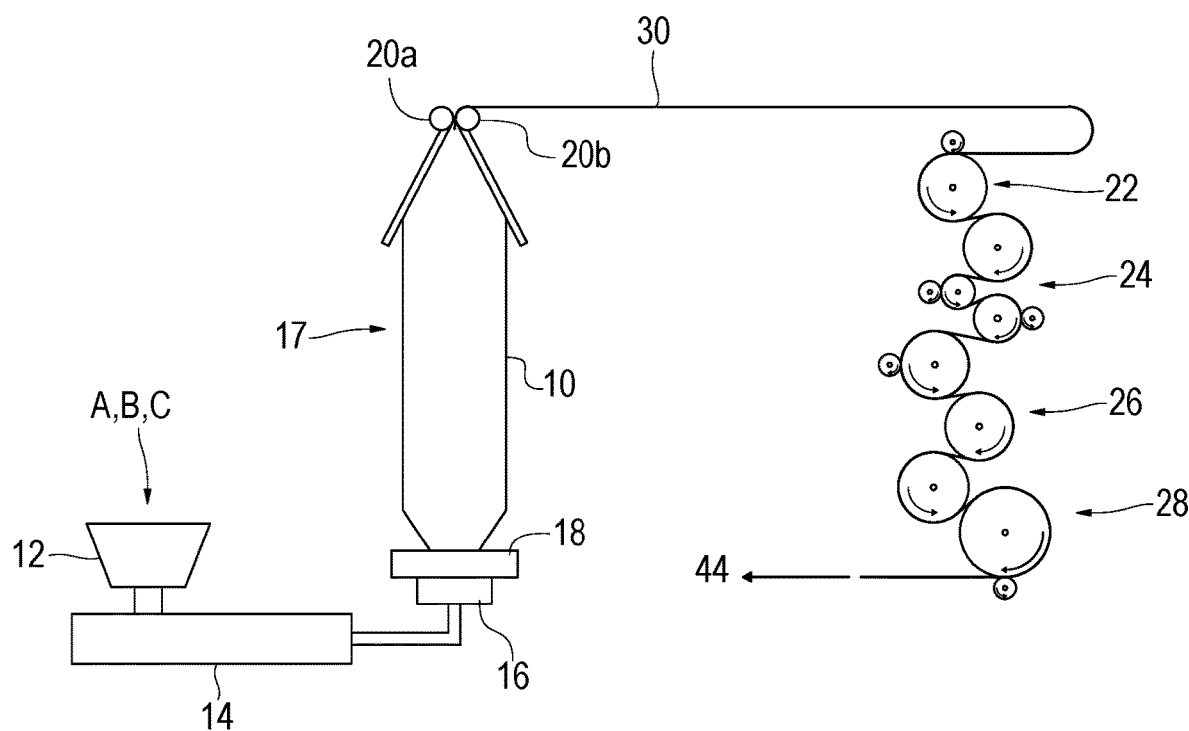
FIG. 1 is a schematic diagram showing an exemplary process for producing a multi-layer MDO film in accordance with an embodiment of the present disclosure.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well, unless the context clearly indicates otherwise.

The terms "first", "second", and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Terms such as "at least one of A and B" should be understood to mean "only A, only B, or both A and B." The same construction should be applied to longer list (e.g., "at least one of A, B, and C").

In some places reference is made to standard methods, such as but not limited to methods of measurement. It is to be understood that such standards are revised from time to time, and unless explicitly stated otherwise reference to such standard in this disclosure must be interpreted to refer to the most recent published standard as of the time of filing. "Melt Index (MI)" may refer to a measure of the ease of flow of the melt of a thermoplastic polymer. Melt index may be measured in grams flowing per ten-minute time interval (g/10 min.) according to methods described in relevant editions of ASTM D1238, approved August 2013 and ISO 1133 published December 2011 and revised February 2012.

Methods of Forming Recyclable Heavy-Gauge Films

The present disclosure provides an improved blown MDO film process for forming heavy-gauge films that are suitable replacements for polyethylene terephthalate (PET) film. The heavy gauge films formed by the process of the present disclosure are recyclable and are particularly suitable for applications requiring thick films, such as peel/reseal labels applied to packaging, that were previously not able to be recycled into common consumer waste streams made up of PE.

FIG. 1 is a schematic diagram showing a process 100 for producing an exemplary blown multi-layer film MDO film 10 in accordance with some embodiments of the present disclosure. The process 100 may be a coextrusion blown film process where multiple materials are extruded simultaneously to produce a multilayered film. One particular advantage of the coextrusion film process is that a multilayer film can be formed in one process step by combining molten layers of each of the film layers into a unitary film structure.

As shown in FIG. 1, blend components A, B, C are loaded into a hopper 12. The blend components A, B, C may begin film production processing in various forms, such as solid rods, pellets, sheet, chunks, or otherwise. Although a particular number of blend components A, B, C are shown in FIG. 1, the foregoing is not limiting, and various numbers of components may be introduced for film production purposes based on substances present in a desired film. The blend components A, B, C are gradually heated in an extruder 14 to melt the components into molten material. The molten material is then extruded through a die 16. The die 16 continuously receives the molten raw materials and coextrudes them together simultaneously through an annular opening 18. The resulting film 10 is coextruded from the die 16 in the form of a tubular bubble 17. In this embodiment, a gas, typically air, is blown through the die 16 and into an interior portion of the coextruded film 10 to radially inflate the film 10 into the bubble 17. Thereafter, the film 10 is drawn vertically upward away from the die 16 at a predetermined speed toward nip rollers 20*a*, 20*b*.

Figure 2:
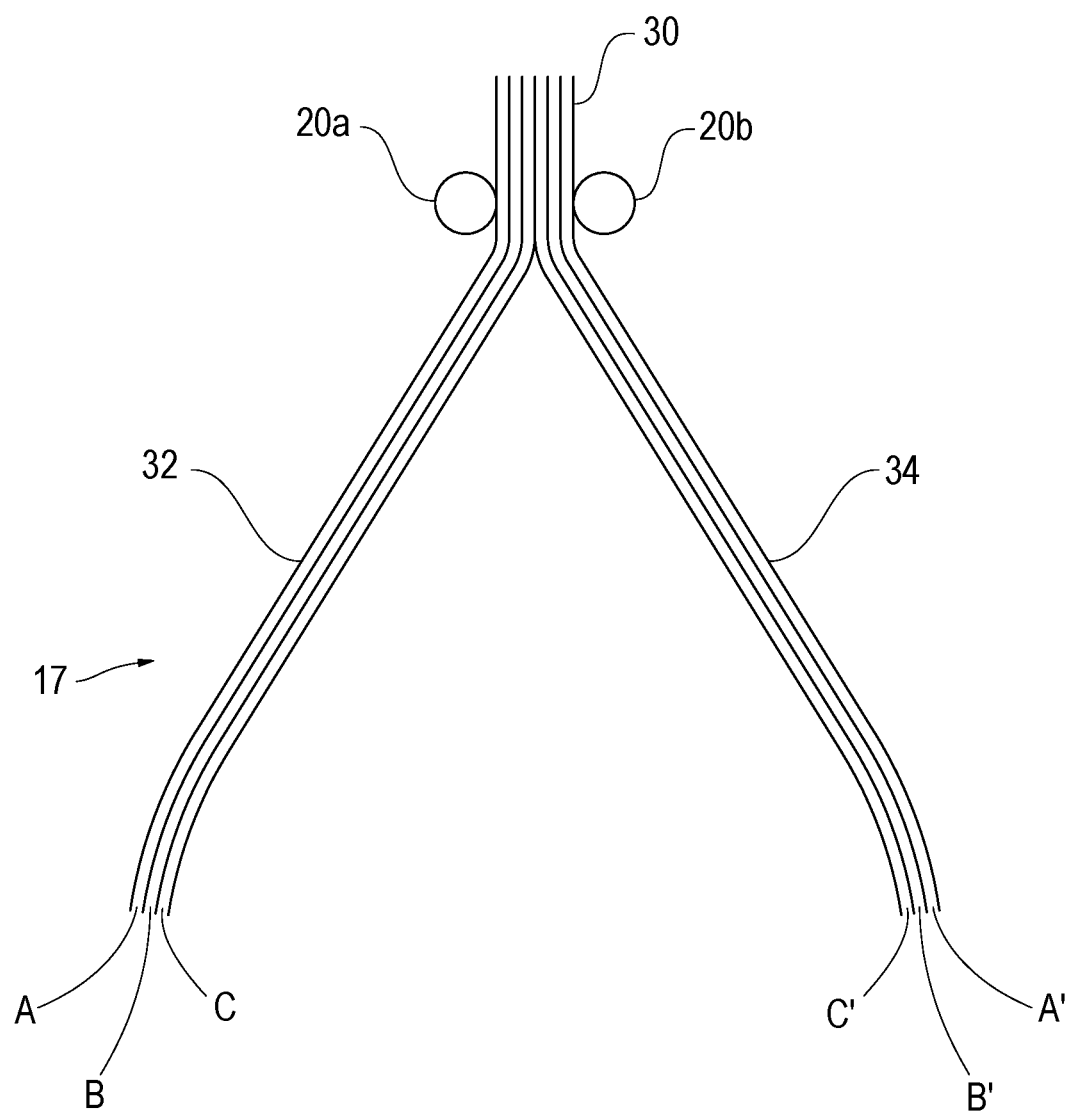
FIG. 2 is an enlarged view showing an upper portion of the bubble in the exemplary process of FIG. 1.

FIG. 2 is an enlarged view showing an upper portion of the bubble 17 where the film 10 approaches the nip rollers 20*a*, 20*b*. The bubble 17 includes three co-extruded layers of film 10, including an outer layer, a middle layer, and an inner layer. The bubble 17 has a first side 32 including three co-extruded layers: an outer layer A, a middle layer B, and an inner layer C, and a second side 34 including three co-extruded layers: an outer layer A', a middle layer B', and an inner layer C'. The first side 32 and the second side 34 each have a first thickness. In the illustrated embodiment, the first side 32 and the second side 34 of the film 10 each have a first thickness of about 5 MIL. However, the first side 32 and the second side 34 may each have a thickness greater than 5 MIL. For example, the first side 32 and the second side 34 may each have a thickness of about 5 MIL to about 10 MIL. In other embodiments, the first side 32 and the second side 34 may each have a thickness less than 5 MIL. For example, the first side 32 and the second side 34 may each have a thickness of about 1 MIL to about 5 MIL.

The outer layers A, A', the middle layers B, B', and the inner layers C, C' may be formed from a variety of thermoplastic polymers including, but not limited to, polyolefins, for example, polyethylene, such as those of low, medium or high density, polypropylene, functionalized polyolefins, polyesters, poly(ester-ether), polyamides, including nylons, poly(ether-amide), polyether sulfones, fluoropolymers, polyurethanes, and combinations thereof. The polyethylene may be substantially linear or branched, and may be formed by various processes known in the art using catalysts such as Ziegler-Natta catalysts, metallocene or single-site catalysts or others widely known in the art.

In some embodiments, the middle layers B, B' may include a blend of two or more thermoplastic polymers having a low melt index. Without being bound by any particular theory, it is believed that by lowering the melt index of a thermoplastic polymer, the viscosity and entanglement of the polymer chains may be increased, which results in films having increased tensile strength and melt strength. Indeed, the blends disclosed herein provide a synergistic multiplier effect in mechanical properties, such as tensile strength, that is at least four times greater than the sum of the two or more components alone. In other embodiments, the blends disclosed herein provide a synergistic multiplier effect in tensile strength that is at least five times greater than the sum of the two or more components alone.

In one embodiment, the blend may include linear low-density polyethylene (LLDPE). As used herein, LLDPE refers to linear copolymers of ethylene and an α-olefin, such as butene, hexene, or octene. The LLDPE may be super hexene linear low-density polyethylene (super hexene LLDPE), such as Westlake HIFOR® Xtreme including one or more of grades SC74858, SC74844, and SC74853; bimodal metallocene linear low-density polyethylene (mLLDPE), such as Exxon Enable™; or various combinations thereof. For example, in one embodiment, the LLDPE is super hexene LLDPE. The LLDPE present in the middle layers B, B' may have a melt index of about 0.7 g/10 min or below. In another embodiment, the LLDPE may have a melt index of about 0.5 g/10 min. or below. In still another embodiment, the LLDPE may have a melt index of about 0.4 g/10 min. or below. In yet another embodiment, the LLDPE may have a melt index of about 0.3 g/10 min. or below. In a preferred embodiment, the LLDPE has a melt index of about 0.5 g/10 min. The LLDPE present in the middle layers B, B' may have a tensile strength at break of about 60 MPa; alternatively, about 50 MPa to about 60 MPa.

The blend may also include high-density polyethylene (HDPE). As used herein, HDPE refers to homopolymers and copolymers of ethylene and an α-olefin (usually 1-butene or 1-hexene) having densities between 0.93 and 0.97 g/cm$^3$. In some embodiments, the blend may include bimodal HDPE. By the term, "bimodal," it is meant that the polymer comprises at least two components, one of which has a relatively low molecular weight and a relatively high density and another of which has a relatively high molecular weight and a relatively low density. The HDPE present in the middle layers B, B' may have a melt index of about 0.7 g/10 min or below. In another embodiment, the HDPE may have a melt index of about 0.5 g/10 min. or below. In still another embodiment, the HDPE may have a melt index of about 0.4 g/10 min. or below. In yet another embodiment, the HDPE may have a melt index of about 0.3 g/10 min. or below. In a preferred embodiment, the HDPE has a melt index of about 0.45 g/10 min. The HDPE present in the middle layers B, B' may have a tensile strength at break of about 35 MPa; alternatively, about 25 MPa to about 45 MPa.

The inner layers C, C' advantageously include a low melt point polymer that is able to bond the first side 32 and the second side 34 of the film 10 together when the film 10 passes through the nip rollers 20*a*, 20*b*. By bonding the first side 32 and the second side 34 together, a new film 30 having twice the thickness (in gauge) as the original film 10 is formed. As will be discussed in more detail below, because the individual first and second sides 32, 34 are bonded together, the new film 30 has a greater thickness than the original extruded film 10 and can maintain a heavy gauge even after the film 30 is processed in the MDO section.

The low melt point polymer present in the inner layers C, C' should have a melting point low enough to allow for the polymer to bond or fuse the two sides 32, 34 of the film 10 together as the film passes through the nip rollers 20*a*, 20*b*. In some embodiments, the low melt point polymer has a melting point of about 115° C. or below. In further embodiments, the low melt point polymer has a melting point of about 110° C. or below. In still further embodiments, the low melt point polymer has a melting point of about 100° C. or below. In yet further embodiments, the low melt point polymer has a melting point of about 90° C. or below. In still other embodiments, the low melt point polymer has a melting point of about 75° C. or below. For example, the low melt point polymer has a melting point of about 80° C. to about 100° C., preferably about 85° C. to about 95° C.

In some embodiments, the low melt point polymer present in the inner layers C, C' is metallocene catalyzed, very-low-density polyethylene (m-VLDPE). As used herein, m-VLDPE refers to polyethylene having a density of less than about 0.916 g/cm$^3$, for example, between about 0.890 g/cm$^3$ and about 0.915 g/cm$^3$. In a preferred embodiment, the m-VLDPE utilized in the inner layers C has a density of about 0.914 g/cm$^3$. In some embodiments, the m-VLDPE has a melt index of about 1.0 g/10 min. or below. In a preferred embodiment, the m-VLDPE has a melt index of about 0.9 g/10 min. or below. The m-VLDPE may have a tensile strength at break of about 60 MPa to about 90 MPa. For instance, the m-VLDPE may have a tensile strength at break of about 65 MPa to about 83 MPa. In other embodiments, the low melt point polymer present in the inner layers C, C' is metallocene linear low-density polyethylene (m-LLDPE). Suitable low melt point polymers that may be utilized in the inner layers C, C' include, for example, MARLEX® D163 Polyethylene produced by Chevron Phillips Chemical.

As the bubble 17 approaches the nip rollers 20a, 20b, the bubble 17 may be collapsed by passing the film 10 through the two nip rollers 20a, 20b, which are in a parallel configuration and placed in close proximity to one another such that the first nip roller 20a contacts the first side 32 of the film 10 while the second nip roller 20b contacts the second side 34 of the film 10. This causes both inner layers C, C' of the bubble 17 to come together and abut one another. The heat and pressure from the nip rollers 20a, 20b then activates the low melt point polymer, for instance, the m-VLDPE, in each of the inner layers C, C' such that it glues or fuses both sides 32, 34 of film 10 together to form the new film 30 having a second thickness that is twice the thickness (in gauge) as the original film 10. Indeed, in the illustrated embodiment, the new film 30 may now have a thickness of 10 MIL, which is the combined thickness of each of the 5 MIL sides 32, 34 of the film 10. Unlike processes known in the art where two separate multilayer films are formed after passing through the nip rollers, the process of the present disclosure is able to join the two separate sides of the bubble together, which effectively doubles the gauge of the resulting film.

After the new film 30 leaves the nip rollers 20a, 20b, it may pass downstream to a set of in-line rollers 22-28 as part of the MDO process. The rollers serve as a post treatment of the film, annealing or conditioning the film to take any stress out of the film and to remove any variation in thickness. The film 30 may undergo stretching in the machine direction. In some embodiments, the film 30 is drawn down to a third thickness that is about one-fifth of the second thickness. For example, because the film 30 is twice as thick as the original film 10 (for example, 10 MIL versus 5 MIL, respectively), when the film 30 is stretched in the MDO process with the typical 5:1 orientation ratio, the film 30 is drawn down to 2 MIL, which is a sufficient heavy-gauge thickness for applications requiring thick films, such as peel/reseal labels applied to packaging. In still further embodiments, the third thickness may be about one-quarter of the second thickness. In yet further embodiments, the third thickness may be about one-third of the second thickness.

A stretching section of the MDO process may include one or more heated rollers 22, followed by one or more stretching rollers 24 and/or one or more cooling rollers 26. The heated roller 22 may heat the film 30 to a desired temperature that is sufficient to allow stretching of the film but is below a melt temperature. In some embodiments, a temperature at which the film 30 may be heated may be from about 50° C. to about 90° C., alternatively from about 40° C. to about 100° C. Quantities and arrangements of the heated rollers 22, the stretching rollers 24, and the cooling rollers 26 may vary and the MDO process may include one or more additional sets of stretching rollers, heated rollers, cooling rollers, or other components in order to achieve desired characteristics of the film 30 (e.g., porosity, opacity). Downstream of the stretching section of MDO process, the film 30 may be annealed by an annealing section. The annealing section can lock in the mechanical properties of the film and control shrinkage. In this section, the film 30 may travel through consecutive cooled and heated rolls.

In some embodiments, rates of speed at which one or more rollers of the MDO process are operating may progressively increase based on a position of the one or more rollers within the MDO process. As an example, a first roller may have a first rotational speed, $\omega_1$ (e.g., rad/s) and first tangential speed, $v_1$ (e.g., m/s). A second roller further downstream in the MDO process may have a second rotational speed, $\omega_2$ and second tangential speed, $v_2$. In some embodiments, the second rotational speed, $\omega_2$ and second tangential speed, $v_2$ may be greater than the first rotational speed, oi and first tangential speed, $v_1$. Subsequent rollers within the stream of MDO process may have a rotational speed and tangential speed that is greater than rotational speed, $\omega_2$ and tangential speed, $v_2$.

Following the MDO process, the film 30 may be rolled, wound, or spooled into rolls as part of wind up process 44 using one or more winding rollers. The wind-up process 44 may allow for the film 30 at room temperature to be formed into rolls for transportation and storage. Other techniques for winding the film 30 may be used in other embodiments.

Recyclable Heavy-Gauge Films

The methods described above produce recyclable heavy-gauge films that are suitable replacements for polyethylene terephthalate (PET) films. The heavy-gauge films produced by the methods of the present disclosure are particularly advantageous for packaging applications requiring thick films, such as peel/reseal labels, as the heavy-gauge films enable the recyclability of the entire packaging structure, including the peel/reseal labels.

The resulting films produced by the methods described above include a film structure that is twice as thick as the original extruded film. An exemplary film structure produced by the method of the present disclosure can be denoted as: A/B/C/C'/B'/A', where A, B, and C represent the outer, middle, and inner layers, respectively, of the first side of the extruded film in the bubble and A', B', and C' represent the outer, middle, and inner layers, respectively, of the second side of the extruded film in the bubble. By bonding the inner layers of the extruded film sheets together, the film is sufficiently thick enough for it to be oriented in the MDO section using the typical 5:1 orientation ratio and result in a film with twice the gauge typically made by the MDO process (while maintaining acceptable stiffness and dimensional rigidity). Although the film described herein has been exemplified as having three layers on each side (six layers total), in some embodiments, each side of the film may include as few as one layer (e.g. monolayer), two layers, or more than three layers so long as the layers of the film have sufficient thicknesses for the film to be oriented in the MDO section and result in a film with twice the gauge as the original extruded film. In still other embodiments, once bonded together, the inner layers C and C' may not be visible as separate layers. In this embodiment, the exemplary film structure may have five visible layers, the structure of which is denoted as: A/B/C-C'/B'/A'.

The outer, middle, and inner layers may include any of the thermoplastic polymers described above. In some embodiments, the aforementioned thermoplastic polymers may be present in the film or in the individual layers in an amount varying from about 1% to 97% by weight. In another embodiment, the aforementioned thermoplastic polymers may be present in the film or in individual layers in an amount varying from about 10% to about 80% by weight. In still another embodiment, the aforementioned thermoplastic polymers may be present in the film or in individual layers in an amount varying from about 20% to about 70% by weight. In yet another embodiment, the aforementioned thermoplastic polymers may be present in the film or in individual layers in an amount varying from about 30% to about 60% by weight. For example, the aforementioned thermoplastic polymers may be present in the film or in individual layers in an amount of about 50% by weight.

In some embodiments, the middle layers may include the blend of two or more thermoplastic polymers having a low melt index, as discussed above. The ultra-low melt index two component blend provides improved tear strength and melt strength such that instances of tears or break offs during the MDO portion of the production process are significantly reduced or eliminated. In this embodiment, any of the thermoplastic polymers of the blend may be present in the film or in individual layers with respect to another of the thermoplastic polymers in the blend in a ratio of about 50% to about 50% (for example, 1:1). In other embodiments, any of the thermoplastic polymers may be present in the film or in individual layers with respect to another of the thermoplastic polymers in the blend in a ratio of about 45% to about 55%. As an example, in a preferred exemplary embodiment, a ratio of LLDPE, such as super hexene LLDPE, to HDPE, such as bimodal HDPE, may be about 50% to 50%.

In further embodiments, the inner layers include the use of the low melt point polymer described above that is able to bond the two sides of the film together to form a higher gauge film. In this embodiment, the low melt point polymer may be present in the film or in individual layers in an amount varying from about 60% to about 95% by weight. In other embodiments, the low melt point polymer may be present in the film or in individual layers in an amount varying from about 70% to about 92% by weight. In still other embodiments, the low melt point polymer may be present in the film or in individual layers in an amount varying from about 75% to about 90% by weight. In a preferred embodiment, the low melt point polymer may be present in the film or in individual layers in an amount of about 88% by weight.

The layers of the film may also include various optional additives. Preferred additives include color concentrates, colorization components, pigments, dyes, antioxidants, slip agents, foaming agents, neutralizers, processing aids, lubricants, heat or light stabilizers, UV stabilizers, hydrocarbon resins, antistatics, fillers, plasticizers, compatibilizers, draw down polymers, viscosity-reducing polymers, and antiblocking agents. A color concentrate may be added to yield a colored layer, an opaque layer, or a translucent layer. Preferred color concentrates include color formulations, including black, white, and other colors suitable for the film of the present invention.

The optional additives may be present in the one or more layers of the film in an amount of about 0.10% to about 50% by weight. In one embodiment, the optional additives are present in the one or more layers of the film in an amount of about 0.20% to about 45% by weight. In another embodiment, the optional additives are present in the one or more layers of the film in an amount of about 0.50% to about 35% by weight. In still another embodiment, the optional additives are present in the one or more layers of the film in an amount of about 1% to about 25% by weight. In yet another embodiment, the optional additives are present in the one or more layers of the film in an amount of about 2% to about 10% by weight. For example, the optional additives may be present in the one or more layers of the film in an amount of about 0.50% to about 2% by weight.

Typically, the thickness of the film is referenced in terms of MILs or gauge (GA, wherein 10 GA=0.1 MIL). In one embodiment, the thickness of the resulting film after processing in the MDO section may be from about 2.0 MIL to 2.5 MIL. In another embodiment, the thickness of the resulting film after processing in the MDO section may be from about 2.0 MIL to 2.2 MIL. In still another embodiment, the thickness of the resulting film after processing in the MDO section may be about 2.0 MIL.

The thicknesses of the outer layers A, A', the middle layers B, B', and the inner layers C, C' can vary. In some embodiments, each of the outer layers A, A' may have a thickness ranging from about 0.15 MIL to about 0.35 ML. For instance, each of the outer layers A, A' may have a thickness of about 0.25 MIL. In further embodiments, each of the middle layers B, B' may have a thickness ranging from about 0.50 MIL to about 0.75 MIL. For example, each of the middle layers B, B' may have a thickness of about 0.60 MIL. In still further embodiments, each of the inner layers C, C' may have a thickness ranging from about 0.05 MIL to about 0.25 MIL. For instance, each of the inner layers C, C' may have a thickness of about 0.15 MIL.

The thicknesses disclosed herein can advantageously allow for reverse printing on the films of the present disclosure. Printing may occur on the inside of the outermost layer such that any ink printing is protected from the outside environment. Reverse printing helps prevent scuffing or scraping of the ink. Any known methods for reverse printing may be utilized in accordance with the present invention. For example, printing can be done by any known means using commercially available UV, Flexographic, UV Flexographic, water-based, solvent or other inks which result in complete adhesion of ink to the label surface. Generally, reverse printing involves having the film layer to be reverse printed undergo treatment so that the film layer will accept ink. The film layer may undergo any suitable surface treatment including, but not limited to, corona discharge treatment, plasma treatment, UV treatment, and/or electron beam treatment. The surface treatment helps make the film layer porous, which allows for the film layer to accept ink more readily. Then, a negative of the design to be printed may be laminated onto the layer such that the printing occurs on the inside of the layer (or the reverse side of the label face). This process may be repeated for any layer of the film that will display a label or design.

The layers of the film may have varying basis weights. In one embodiment, the outer layers of the film (for example, outer layers A, A') may have a basis weight that is about 5% to about 30% of a total basis weight of the film. In some embodiments, the outer layers of the film (for example, outer layers A, A') may have a basis weight that is about 10% to about 25% of a total basis weight of the film. For example, the outer layers of the film (for example, outer layers A, A') may have a basis weight that is about 25% of a total basis weight of the film.

In other embodiments, the middle layers of the film (for example, middle layers B, B') may have a basis weight that is about 40% to about 80% of a total basis weight of the film. In some embodiments, the middle layers of the film (for example, middle layers B, B') may have a basis weight that is about 45% to about 70% of a total basis weight of the film. In other embodiments, the middle layers of the film (for example, middle layers B, B') may have a basis weight that is about 50% to about 60% of a total basis weight of the film. For instance, the middle layers of the film (for example, middle layers B, B') may have a basis weight that is about 60% of a total basis weight of the film.

In still other embodiments, the inner layers of the film (for example, inner layers C, C') may have a basis weight that is about 10% to about 30% of a total basis weight of the film. In some embodiments, the inner layers of the film (for example, inner layers C, C') may have a basis weight that is about 12% to about 25% of a total basis weight of the film. In other embodiments, the inner layers of the film (for example, inner layers C, C') may have a basis weight that is about 15% to about 20% of a total basis weight of the film. For instance, the inner layers of the film (for example, inner layers C, C') may have a basis weight that is about 15% of a total basis weight of the film.

In some embodiments, the films produced in accordance with the present disclosure are recyclable and serve as suitable replacements for films made of PET. Upon disposal of the film made in accordance with the present disclosure (or subsequent product formed of the film), the film and/or product may be recycled. Indeed, the film of the present disclosure can be recyclable to the same extent that #2 HDPE film or #4 linear low-density polyethylene (LLDPE) film is recyclable.

The films formed in accordance with the present disclosure also show superior physical and mechanical properties. For example, the films of the present disclosure have reduced melt strengths when compared to conventional polyethylene films. In one embodiment, the film may have a melt index of about 0.5 g/10 min. or less. In some embodiments, the film may have a melt index of about 0.1 g/10 min. to about 0.5 g/10 min. In still other embodiments, the film may have a melt index of about 0.3 g/10 min. to about 0.5 g/10 min.

The films of the present disclosure also demonstrate superior stiffness. The films according to some embodiments of the present disclosure may have a Gurley stiffness that is at least about four times the Gurley stiffness of conventional MDO polyethylene films. In other embodiments, the films produced in accordance with the present disclosure may have a Gurley stiffness that is at least about six times the Gurley stiffness of conventional MDO polyethylene films. In still other embodiments, the films produced in accordance with the present disclosure may have a Gurley stiffness that is at least about eight times the Gurley stiffness of conventional MDO polyethylene films.

In further embodiments, the films of the present disclosure may have a Gurley stiffness (MD—machine direction) of about 120 to about 360 Gurley Units as measured in accordance with ASTM D6125. In still further embodiments, the films of the present disclosure may have a Gurley stiffness (MD—machine direction) of about 200 to about 300 Gurley Units as measured in accordance with ASTM D6125. In yet further embodiments, the films of the present disclosure may have a Gurley stiffness (MD—machine direction) of about 120 to about 150 Gurley Units as measured in accordance with ASTM D6125. In other embodiments, the films of the present disclosure may have a Gurley stiffness (MD—machine direction) of about 125 to about 145 Gurley Units as measured in accordance with ASTM D6125. In still other embodiments, the films of the present disclosure may have a Gurley stiffness (MD—machine direction) of about 130 to about 140 Gurley Units as measured in accordance with ASTM D6125. In some embodiments, the films of the present disclosure may have a Gurley stiffness (MD—machine direction) of about 135 Gurley Units as measured in accordance with ASTM D6125.

In some embodiments, the films of the present disclosure may have a Gurley stiffness (TD—transverse direction) of about 250 to about 300 Gurley Units as measured in accordance with ASTM D6125. In further embodiments, the films of the present disclosure may have a Gurley stiffness (TD—transverse direction) of about 260 to about 290 Gurley Units as measured in accordance with ASTM D6125. In other embodiments, the films of the present disclosure may have a Gurley stiffness (TD—transverse direction) of about 50 to about 80 Gurley Units as measured in accordance with ASTM D6125. In still other embodiments, the films of the present disclosure may have a Gurley stiffness (TD—transverse direction) of about 55 to about 75 Gurley Units as measured in accordance with ASTM D6125. In yet other embodiments, the films of the present disclosure may have a Gurley stiffness (TD—transverse direction) of about 60 to about 70 Gurley Units as measured in accordance with ASTM D6125. In some embodiments, the films of the present disclosure may have a Gurley stiffness (TD—transverse direction) of about 68 Gurley Units as measured in accordance with ASTM D6125.

In some embodiments, the films of the present disclosure may have a Taber stiffness (MD—machine direction) of about 2.50 to about 4.20 Taber Units. In other embodiments, the films of the present disclosure may have a Taber stiffness (MD—machine direction) of about 2.64 Taber Units to about 4.17 Taber Units. In still other embodiments, the films of the present disclosure may have a Taber stiffness (MD—machine direction) of about 2.75 Taber Units to about 3.20 Taber Units.

The films of the present disclosure also demonstrate superior tensile strength. As used herein, "tensile strength" refers to the amount of stress a material can handle before reaching permanent, non-elastic deformation as measured in accordance with ASTM D882. In some embodiments, the films of the present disclosure may have a tensile strength (MD—machine direction) of about 15,600 to about 19,100 psi. In other embodiments, the films of the present disclosure may have a tensile strength (MD—machine direction) of about 15,800 to about 17,600 psi. In still other embodiments, the films of the present disclosure may have a tensile strength (MD—machine direction) of about 16,200 to about 17,200 psi. In further embodiments, the films of the present disclosure may have a tensile strength (TD—transverse direction) of about 3,000 to about 4,000 psi. In still further embodiments, the films of the present disclosure may have a tensile strength (TD—transverse direction) of about 3,640 to about 3,900 psi.

The films of the present disclosure further demonstrate superior elongation values. "Elongation at yield," as used herein, is the strain that the material undergoes at the yield point, or the percent change in length that occurs while the material is stressed to its yield point as measured in accordance with ASTM D882. In one embodiment, the films may have an elongation at yield (MD—machine direction) of about 120 percent to about 180 percent. In other embodiments, the films may have an elongation at yield (MD—machine direction) of about 130 percent to about 150 percent. In still other embodiments, the films may have an elongation at yield (MD—machine direction) of about 135 percent to about 145 percent.

The films of the present disclosure also have superior tear resistance. In one embodiment, the films have a tear resistance in the machine direction of about 15 to 20 gf as determined in accordance with ASTM D1922. In other embodiments, the films have a tear resistance in the machine direction of about 16 to 18 gf as determined in accordance with ASTM D1922. In further embodiments, the films have a tear resistance in the transverse direction of about 650 to 950 gf as determined in accordance with ASTM D1922. In still further embodiments, the films have a tear resistance in the transverse direction of about 700 to 880 gf as determined in accordance with ASTM D1922. In yet further embodiments, the films have a tear resistance in the transverse direction of about 730 to 850 gf as determined in accordance with ASTM D1922.

The films described herein are useful for a variety of purposes, including, for example, use in packaging containers. In some embodiments, the films described herein are suitable replacements for PET films in applications, such as packaging containers. In other embodiments, the films described herein are useful for peel/re-seal labels on packaging applications, such as on wet wipes pouches. The films described herein may have a white opaque structure. In other embodiments, the films may have a clear structure, which may be formed by removing any white concentrate from the middle and/or inner layers.

EXAMPLES

Example 1

An exemplary sheet of film used in the coextrusion process prior to MDO processing is shown in Table 1 below. The exemplary film of Table 1 has three layers: outer layer A, middle layer B, and inner layer C. The exemplary film has a white opaque structure. Table 1 shows respectively, in columns from left to right: 1) layer identifier; 2) presence of polymeric compositions in the film as a weight percentage of the film thickness; 3) individual resin types present in the film by layer; 4) presence of individual substances in thermoplastic polymeric compositions of the film as a weight percentage of the composition the layer; 5) supplier name by individual thermoplastic polymer; 6) substance type identifier; 7) slip agent (ppm); 8) antiblock agent (ppm); 9) Melt Index (g/10 min.); and 10) density (g/cm$^3$).

Example 2

An exemplary film was produced in accordance with an embodiment of the present disclosure. A comparative MDO polyethylene film (having a gauge of 1 MIL) and a comparative PET sealable film were also produced. The exemplary film and the comparative films were tested for physical and mechanical properties. The results of the testing are shown in Table 2 below.

As can be seen in Table 2, the exemplary film demonstrated superior mechanical properties, including stiffness, when compared to the comparative MDO polyethylene and PET films.

TABLE 2

| Property | ASTM | Units | MDO PE Film (1.0 MIL) Average | MDO PE Film (1.0 MIL) St. Dev | PET Sealable Film Average | PET Sealable Film St. Dev | Exemplary MDO Film (2.0 MIL) |
|---|---|---|---|---|---|---|---|
| Gurley Stiffness-MD | D-6125 | Gurley Units | 32.81 | 5.68 | 10.66 | 1.42 | 134.52 |
| Gurley Stiffness-TD | D-6125 | Gurley Units | 16.68 | 3.31 | 9.84 | 0 | 68.39 |

Example 3

An exemplary film was produced in accordance with an embodiment of the present disclosure. A comparative PET film (48 ga) was also produced. The exemplary film and the comparative film were tested for Gurley stiffness and Taber stiffness. The results of the testing are shown in Table 3 below.

As can be seen in Table 3, the exemplary film demonstrated superior Gurley stiffness values and Taber stiffness values when compared to the comparative PET film.

TABLE 3

| Trial | Exemplary MDO Film (2 MIL) Gurley Stiffness (Gurley Units) | Exemplary MDO Film (2 MIL) Taber Stiffness (Taber Units) | PET Film Gurley Stiffness (Gurley Units) | PET Film Taber Stiffness (Taber Units) |
|---|---|---|---|---|
| MD1 | 270.00 | 2.90 | 303.33 | 3.37 |
| MD2 | 295.00 | 3.25 | 285.00 | 3.11 |
| MD3 | 280.00 | 3.04 | 310.00 | 3.46 |
| MD4 | 360.00 | 4.17 | 283.33 | 3.09 |

TABLE 1

| Layer | % | Resin | % | Supplier | Type | Slip | AB | MI | Density |
|---|---|---|---|---|---|---|---|---|---|
| A | 25% | M6410 | 95.50 | Baystar | HDPE | 0 | 0 | 1.2 | 0.956 |
|  |  | 102109 | 2.00 | Ampacet | slip | 100,000 | 0 | 8 | 0.92 |
|  |  | BI-551 | 0.50 | Bayshore | AB | 0 | 500,000 | 8 | 1.14 |
|  |  | AMF-607 | 2.00 | Bayshore | PA | 0 | 0 | 8 | 0.93 |
| B | 60% | 7845 | 42.00 | Exxon | HDPE | 0 | 0 | 0.45 | 0.958 |
|  |  | SC 74858 | 42.00 | Westlake | LLDPE | 0 | 0 | 0.5 | 0.917 |
|  |  | 102109 | 3.00 | Ampacet | slip | 100,000 | 0 | 8 | 0.92 |
|  |  | AMF-607 | 1.00 | Bayshore | PA | 0 | 0 | 8 | 0.93 |
|  |  | SCC90889 | 12.00 | Standridge | white | 0 | 0 | 8 | 1.72 |
| C | 15% | D-163 | 88.00 | Chevron | m-VLDPE | 0 | 0 | 0.9 | 0.914 |
|  |  | 5755 | 10.00 | Chevron | LDPE | 0 | 0 | 0.8 | 0.925 |
|  |  | BI-607/SCC79600 | 1.00 | Bayshore | PA | 0 | 0 | 8 | 0.93 |
|  |  | BI-107 | 1.00 | Bayshore | slip | 50,000 | 0 | 8 | 0.92 |

TABLE 3-continued

| | Exemplary MDO Film (2 MIL) | | PET Film | |
|---|---|---|---|---|
| Trial | Gurley Stiffness (Gurley Units) | Taber Stiffness (Taber Units) | Gurley Stiffness (Gurley Units) | Taber Stiffness (Taber Units) |
| MD5 | 251.67 | 2.64 | 136.67 | 1.00 |
| Average | 291.33 | 3.20 | 263.67 | 2.81 |
| TD1 | 301.67 | | 288.33 | |
| TD2 | 268.33 | | 190.00 | |
| TD3 | 280.00 | | 216.67 | |
| TD4 | 295.00 | | 230.00 | |
| TD5 | 258.33 | | 240.00 | |
| Average | 280.67 | | 233.00 | |

Example 4

An exemplary film was produced in accordance with an embodiment of the present disclosure. A comparative MDO polyethylene film (having a gauge of 1 MIL) was also produced. The exemplary film and the comparative film were tested for physical and mechanical properties. The results of the testing are shown in Tables 4 and 5 below.

As can be seen in Tables 4 and 5, the exemplary film demonstrated superior physical and mechanical properties when compared to the comparative MDO polyethylene film.

TABLE 4

Properties of Exemplary MDO Film (2 MIL)

| Test | Gauge [mil] | Dyne | Haze | Gloss |
|---|---|---|---|---|
| 1 | 1.75 | 40 | 13.7 | 49.5 |
| 2 | 1.75 | 40 | 15.3 | 58.3 |
| 3 | 1.80 | 40 | 13.9 | 51.5 |
| 4 | 1.90 | 41 | 16.7 | 50.5 |
| 5 | 1.85 | 42 | 16.2 | 41.4 |
| Average | 1.81 | 40.60 | 15.2 | 50.2 |

| | Tensile Strength (Psi) | | Secant Modulus @ 1% (Psi) | | Tear Resistance (gf) | | Elongation % at Break | | COF (non-treat to non-treat) | | COF (treat to treat) | |
|---|---|---|---|---|---|---|---|---|---|---|---|---|
| | | | | | | | | | COF Static (Non-treat to Non-treat) | COF Kinetic (Non-treat to Non-treat) | COF Static (treat to treat) | COF Kinetic (treat to treat) |
| Test | MD | TD | MD | TD | MD | TD | MD | TD | | | | |
| 1 | 19,176 | 3,640 | 146,352 | 159,898 | 15 | 879 | 127 | 475 | 0.369 | 0.350 | 0.438 | 0.327 |
| 2 | 17,604 | 3,649 | 139,119 | 154,479 | 15 | 729 | 141 | 360 | 0.403 | 0.384 | 0.420 | 0.332 |
| 3 | 15,637 | 3,979 | 142,622 | 158,568 | 17 | 872 | 121 | 496 | 0.392 | 0.387 | 0.399 | 0.347 |
| 4 | 15,889 | 3,989 | 146,390 | 161,416 | 17 | 687 | 135 | 443 | 0.411 | 0.399 | 0.419 | 0.341 |
| 5 | 17,495 | 3,894 | 139,596 | 160,943 | 17 | 879 | 150 | 456 | 0.384 | 0.380 | 0.392 | 0.323 |
| Average | 17,160 | 3,830 | 142,816 | 159,061 | 16 | 809 | 135 | 446 | 0.392 | 0.380 | 0.414 | 0.334 |

| | Dart Drop | | | | | Tensile @ Yield (PSI) | | Strain (elongation) @ yield | |
|---|---|---|---|---|---|---|---|---|---|
| | Dart impact @ | FAILURE | grams/mil @ | | Yield | | | | |
| Test | 50% | WEIGHT | 50% | GSM | (in²/lb) | MD | TD | MD | TD |
| 1 | 44 | 50 | 24 | 44.7 | 15,729 | 16,845 | 3,640 | 51 | 5 |
| 2 | | 50 | | 45.2 | 15,555 | 15,710 | 3,649 | 37 | 5 |
| 3 | | 50 | | 44.5 | 15,799 | 15,050 | 3,979 | 38 | 5 |
| 4 | | 50 | | 45.9 | 15,318 | 15,059 | 3,989 | 38 | 5 |
| 5 | | 50 | | 44.4 | 15,835 | 15,142 | 3,894 | 36 | 6 |
| Average | 44 | | 24 | 44.9 | 15,647 | 15,561 | 3,830 | 40 | 5 |

TABLE 5

Properties of MDO Polyethylene Film (1 MIL)

| Test | Gauge (mil) | Dyne | Haze | Gloss |
|---|---|---|---|---|
| 1 | 0.85 | 42 | 15.5 | 42.2 |
| 2 | 0.90 | 45 | 16.3 | 36.2 |
| 3 | 0.85 | 43 | 15.7 | 44.9 |
| Average | 0.87 | 43.33 | 15.8 | 41.1 |

| Test | Tensile Strength (Psi) MD | Tensile Strength (Psi) TD | Secant Modulus @ 1% (Psi) MD | Secant Modulus @ 1% (Psi) TD | Tear Resistance (gf) MD | Tear Resistance (gf) TD | Elongation % at Break MD | Elongation % at Break TD | COF Static (Non-treat to Non-treat) | COF Kinetic (Non-treat to Non-treat) | COF Static (treat to treat) | COF Kinetic (treat to treat) |
|---|---|---|---|---|---|---|---|---|---|---|---|---|
| 1 | 20,563 | 3,982 | 192,011 | 196,992 | 11 | 321 | 53 | 11 | 0.483 | 0.364 | 0.347 | 0.318 |
| 2 | 19,958 | 4,196 | 199,933 | 204,314 | 6 | 254 | 47 | 17 | 0.399 | 0.347 | 0.364 | 0.312 |
| 3 | 20,446 | 3,998 | 193,418 | 197,184 | 13 | 484 | 70 | 13 | 0.412 | 0.351 | 0.388 | 0.326 |
| Average | 20,322 | 4,059 | 195,121 | 199,497 | 10 | >1600 | 57 | 14 | 0.431 | 0.354 | 0.366 | 0.319 |

| Test | Dart Drop Part impact @ 50% | Dart Drop FAILURE WEIGHT | Dart Drop grams/mil @ 50% | GSM | Yield (in²/lb) | Tensile @ Yield (PSI) MD | Tensile @ Yield (PSI) TD | Strain (elongation) @ yield MD | Strain (elongation) @ yield TD |
|---|---|---|---|---|---|---|---|---|---|
| 1 | NOT ENOUGH FILM TO COMPLETE DART DROP TEST | | | 22.1 | 31,813 | 20,563 | 3,987 | 27 | 4 |
| 2 | | | | 21.8 | 32,251 | 19,958 | 4,196 | 27 | 3 |
| 3 | | | | 21.1 | 33,164 | 20,446 | 3,998 | 29 | 3 |
| Average | | | | 21.7 | 32,409 | 20,322 | 4,060 | 28 | 3 |

Example 5

An exemplary film was produced in accordance with an embodiment of the present disclosure. The exemplary film was tested for heat sealability. The heat sealability test was performed with 73 psi seal pressure, 20 in/min crosshead speed, and 1 second dwell.

Figure 3:
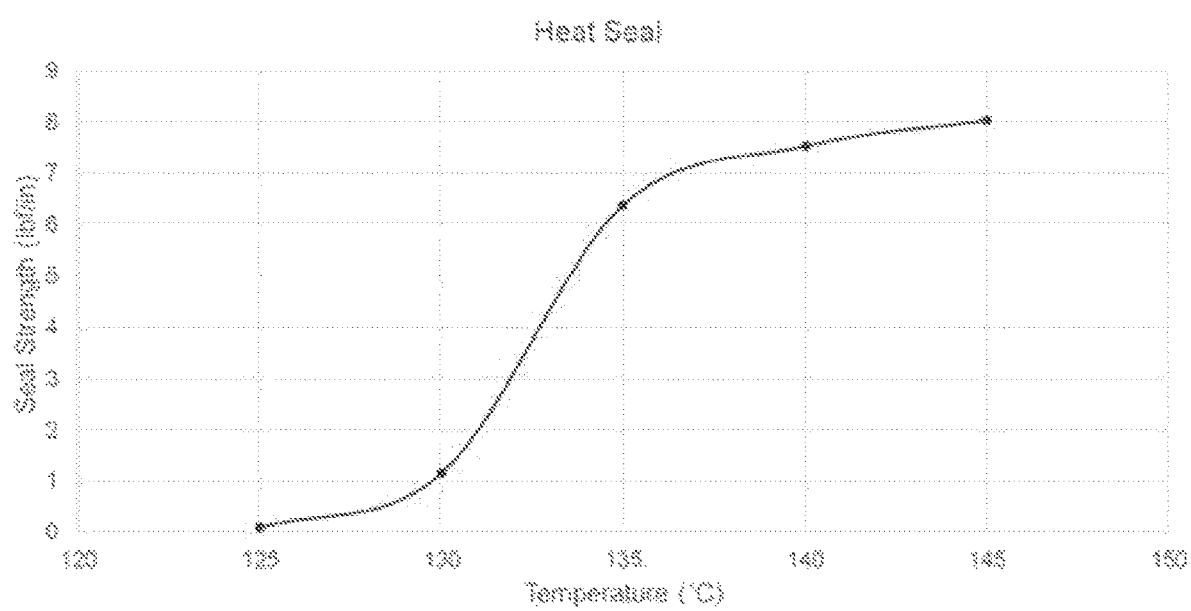
FIG. 3 is a graph showing the heat seal strength of a multi-layer MDO film produced in accordance with an embodiment of the present disclosure.

FIG. 3 is a graph showing the heat seal strength of the exemplary film. As demonstrated in FIG. 3, the exemplary film exhibited improved heat seal strength. For example, the exemplary film exhibited a seal strength of 8 lbf/in at 145° C. (293° F.).

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. A method of forming a multi-layer film, comprising:
   coextruding a film to form a bubble, wherein the bubble comprises a first side and a second side, each of the first side and the second side comprising a plurality of co-extruded layers and having a first thickness, wherein each plurality of co-extruded layers comprises an inner layer comprising a low melt point polymer having a melting point of about 100° C. or below, wherein the low melt point polymer is metallocene catalyzed, very-low-density polyethylene (m-VLDPE);
   heating the low melt point polymer present in the innermost layers to join the first side to the second side to form a multi-layer film having a second thickness that is double the first thickness; and
   stretching the multi-layer film, wherein, after stretching, the multi-layer film has a third thickness that is at least about one-fifth of the second thickness, wherein the low melt point polymer is present in the inner layers in an amount of about 75% to about 92% by weight.

2. The method of claim 1, wherein each plurality of co-extruded layers comprises a middle layer comprising a blend of a first thermoplastic polymer and a second thermoplastic polymer, each of the first thermoplastic polymer and the second thermoplastic polymer having a melt index of about 0.5 g/10 min. or less.

3. A method of forming a recyclable multi-layer film, comprising:
coextruding a film through a die to form a bubble, wherein the bubble comprises a first side and a second side, each of the first and second sides comprising three co-extruded layers and having a first thickness, wherein the three co-extruded layers comprise an outer layer, a middle layer, and an inner layer, wherein the middle layer comprises a blend of a first thermoplastic polymer and a second thermoplastic polymer, each of the first thermoplastic polymer and the second thermoplastic polymer having a melt index of about 0.5 g/10 min. or less, and the inner layer comprises a low melt point polymer having a melting point of about 100° C. or below, wherein the low melt point polymer is metallocene catalyzed, very-low-density polyethylene (m-VLDPE);
passing the co-extruded film through parallel rollers, wherein the parallel rollers are configured to heat the low melt point polymer present in the inner layers such that the inner layer on the first side and the inner layer on the second side are bonded together to form a recyclable, multi-layer film having a second thickness that is double the first thickness; and
passing the recyclable multi-layer film through a series of rollers configured to stretch the recyclable multi-layer film in at least one direction, wherein, after stretching, the recyclable multi-layer film has a third thickness that is at least about one-fifth of the second thickness, wherein the low melt point polymer is present in the inner layers in an amount of about 75% to about 92% by weight.

4. The method of claim 3, wherein the low melt point polymer has a density of about 0.890 g/cm$^3$ to about 0.915 g/cm$^3$.

5. The method of claim 3, wherein the first thermoplastic polymer is linear low-density polyethylene (LLDPE), super hexene linear low-density polyethylene (super hexene LLDPE), bimodal metallocene linear low-density polyethylene (mLLDPE), or a combination of the foregoing.

6. The method of claim 3, wherein the second thermoplastic polymer is high-density polyethylene (HDPE), bimodal high-density polyethylene (bimodal HDPE), or a combination of the foregoing.

7. The method of claim 3, wherein the first thermoplastic polymer has a melt index of about 0.5 g/10 min and the second thermoplastic polymer has a melt index of about 0.45 g/10 min.

8. The method of claim 3, wherein the first thickness is 5 MIL, the second thickness is 10 MIL, and the third thickness is 2 MIL.

9. A recyclable multi-layer film formed by the method of claim 3 and having a thickness of 2 MIL.

* * * * *